United States Patent
Kurita

[15] 3,669,273
[45] June 13, 1972

[54] DEVICE FOR RELEASING FILTER CAKE IN FILTER PRESS

[72] Inventor: Ken-Ichiro Kurita, Suita, Japan

[73] Assignee: Kurita Machinery Manufacturing Company, Limited, Osaka, Japan

[22] Filed: Aug. 28, 1970

[21] Appl. No.: 68,049

[52] U.S. Cl. .......................................................... 210/225
[51] Int. Cl. .......................................................... B01d 25/32
[58] Field of Search .................. 210/225, 224, 230, 231, 384, 210/144

[56] References Cited

UNITED STATES PATENTS

| | | | |
|---|---|---|---|
| 3,289,844 | 12/1966 | Emele | 210/225 |
| 3,360,130 | 12/1967 | Kagg | 210/225 |
| 3,366,244 | 1/1968 | Kurita | 210/225 |
| 3,366,243 | 1/1968 | Kurlta | 210/225 |
| 2,932,399 | 4/1960 | Emele | 210/225 |

Primary Examiner—Reuben Friedman
Assistant Examiner—T. A. Granger
Attorney—McCarthy, Depaoli, O'Brien and Price

[57] ABSTRACT

A plurality of hangers provided with rollers are movably mounted on wavelike rails disposed above a row of filter plates and in parallel with the direction in which the filter plates are moved. Springs whose upper ends are connected to the hangers support the opposite ends of a rod from which suspends the upper portion of a filter cloth disposed along the surfaces of each two adjacent filter plates. When the filter plate is released for transport, the hangers with rollers are thereby moved and the filter cloth is subjected to vibration produced by provision of the wavelike rails and springs.

7 Claims, 3 Drawing Figures

Inventor
KEN-ICHIRO KURITA

By McCarthy, Depaoli & O'Brien
Attorneys much as 3,669,273

DEVICE FOR RELEASING FILTER CAKE IN FILTER PRESS

BACKGROUND OF THE INVENTION

The present invention relates to a filter press, more particularly to a filter press provided with a device for releasing filter cake automatically.

In a filter press, cake drops off a filter cloth due to its own weight simply by moving the filter plates if the cake is low in viscosity. Where a liquid of a high viscosity is treated, however, there is a need to impart vibration to the filter cloth so as to cause the cake to release from the cloth. For this purpose, various proposals have been made. It is desired that a device for subjecting the filter cloth to vibration be simple in construction and efficient to operate, since if a power source is required for producing vibration, for instance, complex transmitting means therefor has to be provided with a resultant disadvantage of cost increase.

SUMMARY OF THE INVENTION

An object of the present invention is to impart effective vibration to a filter cloth by utilizing a movement inherent to the filter press without employing torque or electrical or pneumatic means as an external power source for giving vibration to the filter cloth.

In accordance with the present invention, a filter cloth disposed along the filtering surfaces of each two adjacent filter plates and extending upward above the plates is held in tension by a suspender rod and springs supporting the suspender rod. These springs are each suspended from hangers with rollers corresponding to the suspender rods in number and mounted on each of wavelike rails longitudinally disposed above a row of the filter plates in parallel with the direction in which the plates are transported.

While the filter plates are in closed position for filtering operation, the hangers are positioned close to each other, but when one filter plate is released and transported to open position after filtration, the filter cloth between the plate and the next plate is forced to be released from the plate surface and due to the displacement of the filter plate the suspender rod is moved along the rails, with the result that the springs and the hangers supporting the springs are moved on the rails.

During this transport operation, the hangers are vertically jolted when passing over the wavelike surfaces of the rails and the jolting movement and torsional action of the spring coact to impart vibration to the filter cloth.

The present invention is characterized by the opening of the filter cloth effected by the movement of the filter plate, jolting movement of the hangers along the wavelike rails and torsional action of the springs.

In order to produce a vibration effectively, the wavelike track on the rails for the rollers may further be provided with such modified undulation that the rollers can readily move over, the modification being in the form of sawtooth, whereby a vibration which is irregular in intensity can be superposed on the action of the spring to insure irregularity of vibration and thereby achieve effective release of cake.

DESCRIPTION OF PREFERRED EMBODIMENTS

Figure 1:
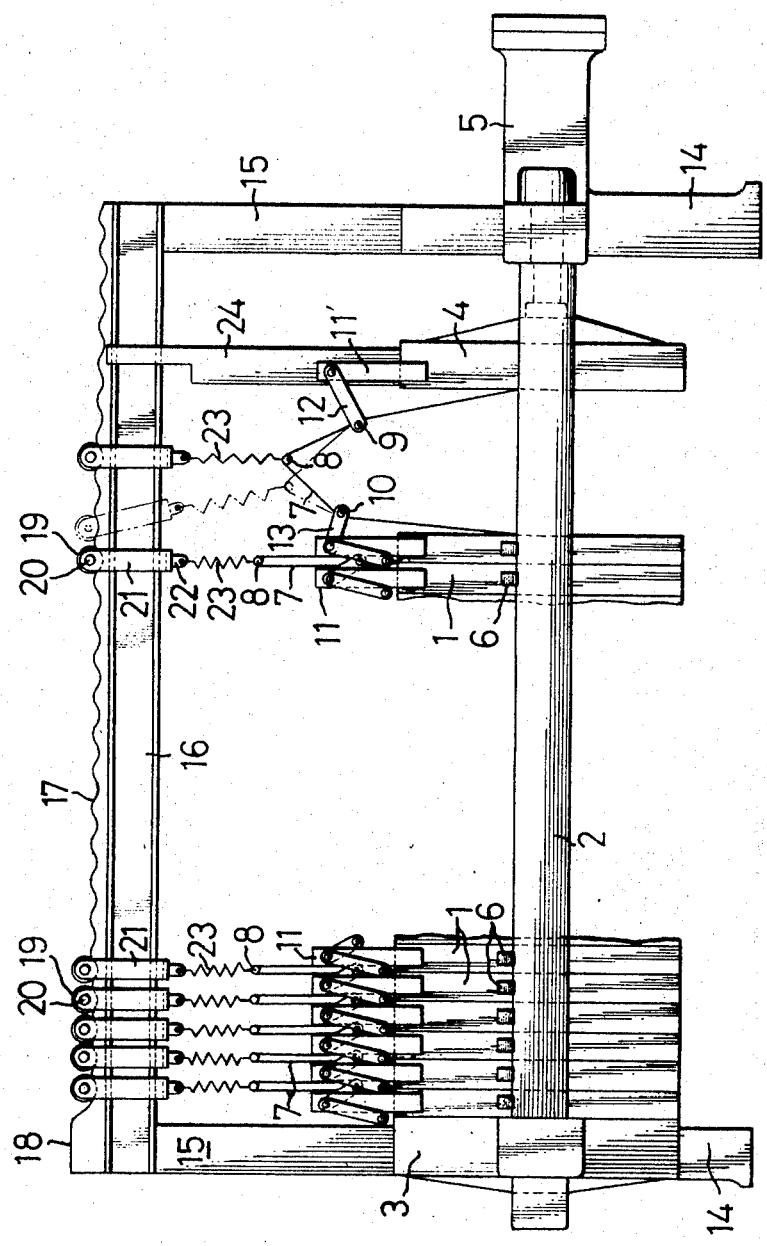
FIG. 1 is a side elevation showing a preferred embodiment of the filter press in accordance with this invention.
Figure 2:
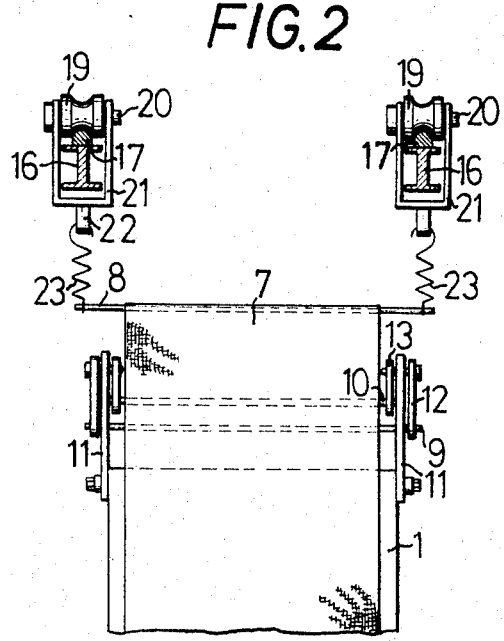
FIG. 2 is a view in section taken along the line II—II of FIG. 1.

An embodiment shown in FIGS. 1 and 2 comprises filter plates 1, side bars 2 for supporting filter plates1, a stationary end plate 3, a movable end plate 4 and a hydraulic actuator for the movable end plate 4.

The filter plates 1 supported on side bars 2 in known manner, with projections 6 resting thereon, are pressed against the stationary end plate 3 by the hydraulic actuator 5 during iltering operation. After completion of the operation, the filter plates 1 are released and moved one after another toward the retracted movable end plate 4 by unillustrated transport means. A sheet of filter cloth 7 is disposed along the filtering surfaces of each two adjacent filter plates with the upper portion thereof extending upward to be hung on a rod 8 which is suspended as will be described later. The embodiment shown in FIG. 1 further includes a second rod 9 and a third rod 10 each positioned between the rod 8 and the filter plate 1. The filter cloth 7 passes over these rods 9 and 10. Extending upward from the upper portion of each filter plate 1 are support bars 11 fixed to the opposite sides of the plate 1. Arm members 12 and 13 formed of two links or springs of different lengths are pivotally attached to the support bar 11. The rods 9 and 10 are rotatably supported on the distal ends of pairs of arm members 12 and 13 respectively. Support bars secured to the movable end plate 4 are indicated at 11'.

Each frame 14 supporting the side bars 2 is provided, on the opposite sides thereof, with a pair of upwardly extending pillar members 15 which supports a beam 16 longitudinally disposed above the row of the filter plates 1 along each opposite sides thereof. A wavelike rail 17 is secured to the upper face of the beam 16. A raised portion 18 serving as stopper is formed at one end of the rail 17. Mounted on the rail 17 are rollers 19 provided with U-shaped hangers 21 suspending from roller shafts 20, the number of the rollers 19 being equal to that of the sheets of filter cloth 7 disposed between the filter plates 1. The lower ends of coil springs 23 connected to connectors 22 at the lower portion of hangers 21 are connected to the opposite ends of the rod 8. Thus the filter cloth 7 is pulled upward in tension by means of the springs 23.

The filter plates 1 are pressed together for filtration by the movable end plate 4, and after operation the end plate 4 is retracted and the filter plates 1 are moved toward the end plate 4 one after another. During filtering operation, the filter cloth 7 is held in vertical position in fitting contact with itself as seen in the drawing, but when the movable end plate 4 is moved away, the filter cloth 7, as it is brought to an open position, moves the rod 8 downward thereby pulling the spring 23 obliquely as indicated by a chain line in FIG. 1. Accordingly, the hanger 21 is subjected to a horizontal component, which, upon exceeding a certain limit, causes the roller 20 to abruptly slide toward the movable end plate 4 along the wavelike rail. At this time, the undulation of the wavelike rail imparts a vertical vibration to the hanger 21, the resultant shock further producing an irregular action of the spring 23, so that the filter cloth 7 is flapped and filter cake is thereby shaken off the cloth 7. Thus, every time one filter plate 1 is moved, the filter cloth 7 between the filter plate 1 and the adjacent filter plate 1 is given a great vibration which results in effective removal of cake even where it has a high viscosity. After all filter plates 1 have been sent toward the movable end plate 4, the plates are pushed back to the original filtering position by the end plate 4. A group of hangers 21 are also sent backward by a pusher 24 mounted on the movable end plate 4.

In order to facilitate the actuating movement of the hangers, the device of FIG. 1 may be modified by disposing the wavelike rail 17 at such inclination that it is downwardly inclined toward the movable end plate 4, with the end thereof above the stationary end plate 3 positioned at a higher level.

Figure 3:
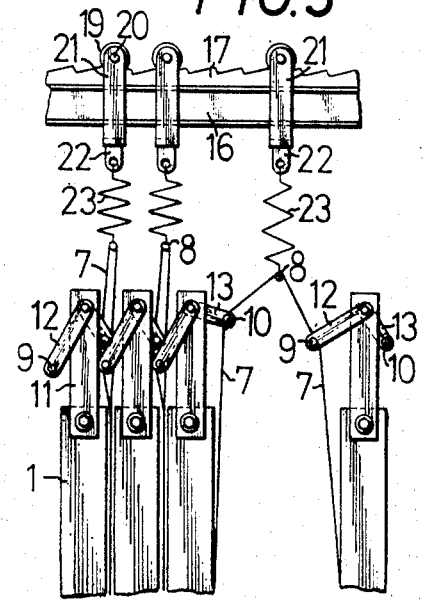
FIG. 3 is a side elevation showing a modified embodiment.

FIG. 3 shows another modified embodiment of the rail 17 wherein the rail 17 is formed with a saw-toothed upper surface 25. While facilitating movement of the hangers along the rail during transport of the filter plates, this embodiment allows the hangers to drop sharply as the rollers move off the saw-toothed ridges into the grooves. As a result, bouncing action of the spring 23 brings the filter cloth into intense vibration for removal of cake.

I claim

1. In a filter press including a plurality of filter plates supported on side bars, a movable end plate for pressing said filter plates against a stationary end plate and a filter cloth disposed along the filtering surfaces of each two adjacent filter plates, a device for releasing filter cake from said filter cloth, comprising wave-like rails disposed above said filter plates in parallel with the direction of movement of said filter plates and having at least one convexity and one concavity corresponding to each of said filter plates, a plurality of rollers rotatably mounted on said wavelike rails, hangers supported on shafts of said rollers, springs connected to said hangers, and rods whose opposite ends are connected to said springs and over which the upper portions of said filter cloth are hung, whereby sequential retraction of said end plate and said filter plates sequentially moves said rods downwardly, pulls said springs obliquely, and causes said rollers to slide abruptly toward said end plate and fall into said concavities so that said cloth is vibrated.

2. The filter press as claimed in claim 1 wherein a means for pushing said hangers backward is mounted on said movable end plate.

3. The filter press as claimed in claim 1 wherein said wavelike rails are inclined gradually downward toward said movable end plate.

4. The filter press as claimed in claim 1 wherein said wavelike rails are in the form of a sawtooth.

5. The filter press as claimed in claim 1 wherein said rail is provided with a stopper at the end thereof above said stationary end plate.

6. The filter press as claimed in claim 1 wherein a second rod is mounted on the ends of arm members pivotally attached to support bars on the opposite sides of each of said filter plates, one part of said filter cloth being passed on said second rod.

7. The filter press as claimed in claim 6 wherein a third rod is mounted on the ends of said arm members pivotally attached to said support bars on the opposite sides of each of said filter plates, the other part of said filter cloth being passed on said third rod.

* * * * *